US012791734B2

(12) United States Patent
Jiang et al.

(10) Patent No.: US 12,791,734 B2
(45) Date of Patent: Nov. 10, 2026

(54) METHOD FOR TRACKING SATELLITE, ELECTRONIC DEVICE AND STORAGE MEDIUM

(71) Applicants: Beijing BOE Sensor Technology Co., Ltd., Beijing (CN); BOE Technology Group Co., Ltd., Beijing (CN); Beijing BOE Technology Development Co., Ltd., Beijing (CN)

(72) Inventors: Rudan Jiang, Beijing (CN); Long Miao, Beijing (CN); Xueyan Su, Beijing (CN); Meng Wei, Beijing (CN); Dongyao Wang, Beijing (CN); Yunzhang Zhao, Beijing (CN); Zhifeng Zhang, Beijing (CN)

(73) Assignees: Beijing BOE Sensor Technology Co., Ltd., Beijing (CN); BOE Technology Group Co., Ltd., Beijing (CN); Beijing BOE Technology Developement Co., Ltd., Beijing (CN)

( * ) Notice: Subject to any disclaimer, the term of this patent is extended or adjusted under 35 U.S.C. 154(b) by 308 days.

(21) Appl. No.: 18/600,068

(22) Filed: Mar. 8, 2024

(65) Prior Publication Data

US 2025/0076518 A1 Mar. 6, 2025

Related U.S. Application Data

(63) Continuation of application No. PCT/CN2023/115171, filed on Aug. 28, 2023.

(51) Int. Cl.

| | |
|---|---|
| ***G01S 19/26*** | (2010.01) |
| ***G01S 19/30*** | (2010.01) |
| ***H01Q 3/36*** | (2006.01) |

(52) U.S. Cl.
CPC .............. *G01S 19/26* (2013.01); *G01S 19/30* (2013.01); *H01Q 3/36* (2013.01)

(58) Field of Classification Search
CPC ........... G01S 19/26; G01S 19/30; G01S 3/38; H01Q 3/36; H01Q 1/1257; H04B 7/185
(Continued)

(56) References Cited

U.S. PATENT DOCUMENTS 6,433,736 B1 * 8/2002 Timothy .................. H01Q 3/08 342/359
7,230,569 B1 * 6/2007 Hules ....................... H01Q 3/04 342/359
(Continued)

FOREIGN PATENT DOCUMENTS

CN 112255615 A * 1/2021 ............... G01S 7/02
CN 112977887 A 6/2021
(Continued)

OTHER PUBLICATIONS

Study On Wide-Angle Scanning Linear Phased Array Antenna (Yang, Guangwei et al., IEEE Transactions on Antenna Propagation, vol. 66, No. 1, Jan. 2018 (Year: 2018).*
(Continued)

*Primary Examiner* — Nuzhat Pervin
(74) *Attorney, Agent, or Firm* — IPro, PLLC

(57) ABSTRACT

Provided is a method for tracking a satellite. The method includes: acquiring trajectory information and antenna attitude information of a COTM device; calculating a theoretical pointing angle of an antenna beam for a target satellite based on an orbit parameter of the target satellite and the trajectory information; acquiring an actual pointing angle of the antenna beam by correcting, based on the antenna attitude information, the theoretical pointing angle of the antenna beam; controlling, based on the actual pointing
(Continued)

angle of the antenna beam, a receiving phased array antenna to form an antenna beam; acquiring data information of the satellite signal, and correcting an actual pointing angle of the current antenna beam; controlling a transmitting phased array antenna to form an antenna beam based on a corrected actual pointing angle; establishing a communication link and updating ephemeris data of the target satellite.

18 Claims, 6 Drawing Sheets

(58) Field of Classification Search
USPC .......................................................... 342/354
See application file for complete search history.

(56) References Cited

U.S. PATENT DOCUMENTS

| | | | | |
|---|---|---|---|---|
| 8,907,846 | B2 * | 12/2014 | Sharawi | G01S 3/38 701/4 |
| 10,008,759 | B2 * | 6/2018 | Ness | H01Q 13/025 |
| 10,103,433 | B2 * | 10/2018 | DiNallo | H01Q 3/28 |
| 10,483,629 | B1 * | 11/2019 | Silva | H01Q 3/2605 |
| 10,756,413 | B2 * | 8/2020 | Merrell | H01Q 1/42 |
| 10,756,443 | B1 * | 8/2020 | Struhsaker | H01Q 25/002 |
| 11,101,553 | B2 * | 8/2021 | Adada | H01Q 25/00 |
| 11,637,368 | B2 * | 4/2023 | Cordill | H04B 17/14 342/174 |
| 11,824,272 | B2 * | 11/2023 | Valdes Garcia | G01R 29/10 |
| 2003/0222816 | A1 * | 12/2003 | Liu | H01Q 3/005 342/359 |
| 2004/0041730 | A1 * | 3/2004 | Fowell | H01Q 3/005 342/359 |
| 2007/0146201 | A1 * | 6/2007 | Hules | H04H 40/90 342/359 |
| 2017/0115385 | A1 * | 4/2017 | Di Palma | H01Q 3/46 |
| 2017/0254903 | A1 * | 9/2017 | Johnson | G01S 3/42 |
| 2020/0313780 | A1 * | 10/2020 | Park | G01S 19/06 |
| 2022/0109235 | A1 * | 4/2022 | Dueri | H01Q 3/08 |
| 2022/0404449 | A1 * | 12/2022 | Chou | G01S 3/38 |
| 2023/0187825 | A1 * | 6/2023 | Chae | H01Q 21/08 |
| 2024/0187045 | A1 * | 6/2024 | Merrell | H04B 7/043 |
| 2024/0372253 | A1 * | 11/2024 | Mendelsohn | H01Q 3/36 |

FOREIGN PATENT DOCUMENTS

| | | | | |
|---|---|---|---|---|
| CN | 113701753 | A * | 11/2021 | G01S 19/46 |
| CN | 113890598 | A * | 1/2022 | H01Q 3/02 |
| CN | 114389036 | A | 4/2022 | |
| CN | 115051158 | A | 9/2022 | |
| EP | 0920072 | A2 * | 6/1999 | H01Q 25/00 |
| EP | 3499260 | A1 * | 6/2019 | H04B 7/0617 |
| KR | 20220095476 | A | 7/2022 | |
| WO | 2023011602 | A1 | 2/2023 | |

OTHER PUBLICATIONS

PCT/CN2023/115171 international search report and written opinion dated May 16, 2024.

* cited by examiner

METHOD FOR TRACKING SATELLITE, ELECTRONIC DEVICE AND STORAGE MEDIUM

CROSS-REFERENCE TO RELATED APPLICATIONS

This application is a continuation application of international application No. PCT/CN2023/115171, filed on Aug. 28, 2023, the disclosure of which is herein incorporated by reference in its entirety.

TECHNICAL FIELD

The present disclosure relates to the field of communication technologies, and in particular, relates to a method for tracking a satellite, an electronic device, and a storage medium.

BACKGROUND

Communications on-the-move (COTM) is a satellite communication earth station and the communications on-the-move is a broadband mobile satellite communication realized by utilizing satellite resources. The communications on-the-move can be integrated on mobile platforms such as vehicles, ships and airplanes. Due to a long distance between the satellite and the ground, there is significant link loss. To enable broadband communication between the mobile platform and the satellite, high-gain directional antennas must be utilized. However, high antenna gain comes with the consequence of a very narrow radiation beam (typically around 2° or less). As a mobile carrier moves at a high speed, causing its position and especially attitude angle change rapidly, the antenna attitude changes accordingly. If an attitude of the antenna shifts beyond the antenna beam width, gain of the antenna decreases and the communication bit error rate increases. It becomes particularly challenging when the carrier encounters rough roads or sharp turns, or when a small ship faces turbulent conditions, such as rolling, pitching and hull steering. In such cases, an attitude of the carrier experiences significant changes. If a tracking response speed or a tracking response accuracy of the antenna is inadequate, the attitude of the antenna deviates from the satellite, resulting in a communication interruption. Therefore, it is crucial that the beam irradiated by the antenna continuously maintains accurate alignment and tracking with the satellite, thereby ensuring stability of the communication link.

SUMMARY

A method for tracking the satellite is provided in some embodiments of the present disclosure. The method includes: acquiring trajectory information and antenna attitude information of a communications on-the-move device in real time; calculating a theoretical pointing angle of an antenna beam for a target satellite based on an orbit parameter of the target satellite and the trajectory information of the communications on-the-move device; acquiring an actual pointing angle of the antenna beam by correcting, based on the antenna attitude information of the communications on-the-move device, the theoretical pointing angle of the antenna beam; enabling a receiver to parse a satellite signal received by a receiving phased array antenna and detect a signal strength by controlling, based on the actual pointing angle of the antenna beam, a receiving phased array antenna in the communications on-the-move device to form an antenna beam; in response to the signal strength of the satellite signal being greater than or equal to a predetermined value, changing a current antenna beam of the receiving phased array antenna, acquiring data information of the satellite signal, correcting an actual pointing angle of the current antenna beam, and controlling a transmitting phased array antenna and a receiving phased array antenna to form antenna beams based on a corrected actual pointing angle; and establishing a communication link and updating ephemeris data of the target satellite.

In some embodiments, the method further includes: in response to the signal strength of the satellite signal being less than the predetermined value, calculating the actual pointing angle of the antenna beam at a current moment based on the orbit parameter of the target satellite, and the trajectory information and the antenna attitude information of the communications on-the-move device at the current moment, and performing the process of enabling the receiver to parse the satellite signal received by the receiving phased array antenna and detect the signal strength by controlling, based on the actual pointing angle of the antenna beam, the receiving phased array antenna in the communications on-the-move device to form the antenna beam.

In some embodiments, the antenna attitude information includes a pitch angle, a roll angle and an azimuth angle of the antenna beam; and the acquiring the trajectory information and the antenna attitude information of the communications on-the-move device in real time includes: acquiring the pitch angle, the roll angle and an initial azimuth angle determined by a strapdown inertial navigation system in the communications on-the-move device, and acquiring a reference azimuth angle determined by a global navigation satellite system (GNSS) in the strapdown inertial navigation system; and acquiring the azimuth angle by correcting the initial azimuth angle using the reference azimuth angle.

In some embodiments, in a case that the target satellite is a geostationary satellite, the orbit parameter includes orbit position information; and the calculating the theoretical pointing angle of the antenna beam for the target satellite based on the orbit parameter of the target satellite and the trajectory information of the communications on-the-move device includes: for the target satellite, calculating the theoretical pointing angle of the antenna beam based on the orbit position information of the target satellite and the trajectory information of the communications on-the-move device.

In some embodiments, in a case that the target satellite is a geostationary satellite, the orbit parameter includes ephemeris data; and the calculating the theoretical pointing angle of the antenna beam for the target satellite based on the orbit parameter of the target satellite and the trajectory information of the communications on-the-move device includes: for the target satellite, establishing time synchronization with the ephemeris data of the target satellite by using time information output by a GNSS of a strapdown inertial navigation system in the communications on-the-move device, and calculating the theoretical pointing angle of the antenna beam based on the ephemeris data and the trajectory information of the communications on-the-move device.

In some embodiments, the enabling the receiver to parse the satellite signal received by the receiving phased array antenna and detect the signal strength by controlling, based on the actual pointing angle of the antenna beam, the receiving phased array antenna in the communications on-the-move device to form the antenna beam includes: by sending, based on the actual pointing angle of the antenna beam, a beamforming instruction to a beam control board of a sub-array module of one receiving phased array antenna in the communications on-the-move device, enabling a beam control board of a sub-array module of another remaining receiving phased array antenna and a beam control board of each transmitting phased array antenna to perform time synchronization and frequency synchronization, and enable, by solving a code table to drive a receiving sub-array module of a corresponding receiving phased array antenna and a transmitting sub-array module of a transmitting phased array antenna to form antenna beams based on the actual pointing angle, the receiver to parse the satellite signal received by the receiving phased array antenna and detect the signal strength.

In some embodiments, in response to the signal strength of the satellite signal being greater than or equal to the predetermined value, changing the current antenna beam of the receiving phased array antenna, acquiring the data information of the satellite signal, correcting the actual pointing angle of the current antenna beam, and controlling the transmitting phased array antenna and the receiving phased array antenna to form the antenna beams based on the corrected actual pointing angle includes: in response to the signal strength of the satellite signal being greater than or equal to the predetermined value, controlling the current antenna beam of the receiving phased array antenna to perform adaptive scanning within an angle range, performing amplitude comparison detection on strengths of signals of the target satellite received at different beam positions along a beam trajectory of the receiving phased array antenna within at least one scanning cycle, performing angle measurement of the target satellite, correcting the actual pointing angle of the current antenna beam based on results of the amplitude comparison detection and the angle measurement, and controlling the transmitting phased array antenna and the receiving phased array antenna to form the antenna beams based on the corrected actual pointing angle.

In some embodiments, in response to the signal strength of the satellite signal being greater than or equal to the predetermined value, changing the current antenna beam of the receiving phased array antenna, acquiring the data information of the satellite signal, correcting the actual pointing angle of the current antenna beam, and controlling the transmitting phased array antenna and the receiving phased array antenna to form the antenna beams based on the corrected actual pointing angle includes: in response to the satellite signal strength being greater than or equal to the predetermined value, controlling the current antenna beam of the receiving phased array antenna to periodically form beams in a pattern of "sum beam-difference beam-difference beam-sum beam", performing amplitude comparison detection on strengths of signals of the target satellite received within at least one cycle, performing angle measurement of the target satellite, correcting the actual pointing angle of the current antenna beam based on results of the amplitude comparison detection and the angle measurement, and controlling the transmitting phased array antenna and the receiving phased array antenna to form the antenna beams based on the corrected actual pointing angle.

In some embodiments, the method further includes: acquiring the antenna attitude information acquired by a strapdown inertial navigation system of the communications on-the-move device at a power-on moment, wherein the antenna attitude information includes a pitch angle, a roll angle and an azimuth angle; and predicting initial trajectory information based on the azimuth angle and a historical trajectory.

An electronic device for tracking a satellite is provided in some embodiments of the present disclosure. The electronic device includes: a memory, a processor and a computer program stored in the memory and able to run by the processor, wherein when the computer program is loaded and run by the processor, causes the processor to perform the method for tracking the satellite as defined above.

A non-transitory computer-readable storage medium is provided in some embodiments of the present disclosure. The non-transitory computer-readable storage medium stores a program of a method for tracking a satellite. When the program is loaded and run by a processor, causes the processor to perform the method for tracking the satellite as defined above.

DETAILED DESCRIPTION

Figure 1:
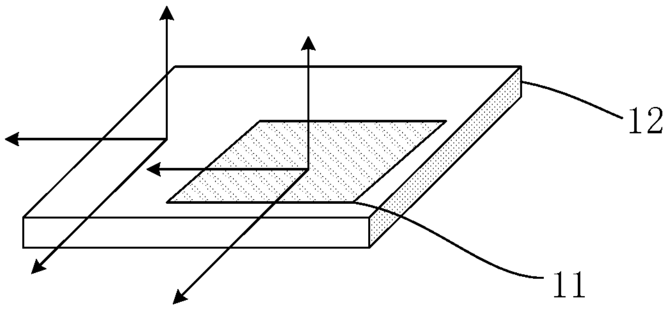
FIG. 1 is a schematic diagram of a reference coordinate system of a phased array antenna.

To enable those skilled in the art to better understand the technical solutions of the present disclosure, the present disclosure is described in detail hereinafter with reference to the accompanying drawings and embodiments.

Unless otherwise defined, technical or scientific terms utilized herein should have the usual meanings understood by those of ordinary skill in the field to which the present disclosure belongs. Terms such as "first" and "second" utilized herein do not denote any order, quantity or importance, but are merely intended to distinguish between different constituents. Similarly, the terms "one," "a," "the" and similar words are not meant to limit the quantity, but rather denote the presence of at least one. Terms such as "include" or "comprise" means that an element or an item appearing before the term encompass elements or items listed after the term and their equivalents, without excluding other elements or items. Terms such as “connected to” and “connected with” are not restricted to physical or mechanical connections, but also include electrical connections, whether direct or indirect. “Upper,” “lower,” “left,” “right,” and the like are utilized only to indicate a relative positional relationship, and in a case that an absolute position of a described object is changed, the relative positional relationship is changed accordingly.

In some practices, the communications on-the-move antenna system typically employs a mechanical tracking system. As the carrier moves, a mechanical adjustment controller aligns a reflector antenna or a flat panel antenna array with the satellite based on an antenna attitude fed back by an inertial navigation system. However, due to a beam irradiated by the antenna is driven by a machine, a tracking speed is low and a pointing error is large, resulting in decreased tracking accuracy.

An attitude feedback solution based on a high-precision inertial navigation system directly adopts an attitude angle and azimuth angle feedback control. An antenna pointing angle is relatively precise. However, due to an output of the attitude angle and the azimuth angle lag one frame behind an angular rate, system real-time performance is compromised. Additionally, to acquire highly accurate attitude measurement information, high-precision optical fibers or laser-based inertial navigation systems are generally required, which significantly increases the system cost. Currently, a solution that combines gyro angular rate feedback with satellite signal scanning is adopted by conventional communications on-the-move manufacturers, wherein the solution is known as the strapdown inertial navigation system/global navigation satellite system (GNSS)/beacon scanning. Implementation of the solution is simple and the solution provides high bandwidth and real-time capabilities. The solution is primarily used in mechanical beam regulation systems. However, in scenarios involving dual-motion applications such as low earth orbit satellites or multi-orbit satellite switching, due to the beacon scanning involves continuous swinging around a pointing direction, that is, an antenna repeatedly and alternately rotates on a pitch plane and an azimuth plane to gradually align the antenna beam with the satellite, wherein a tracking angular velocity is typically around 20°/s to 50°/s, suitability for high-speed communications on-the-move applications is limited.

Figure 2:
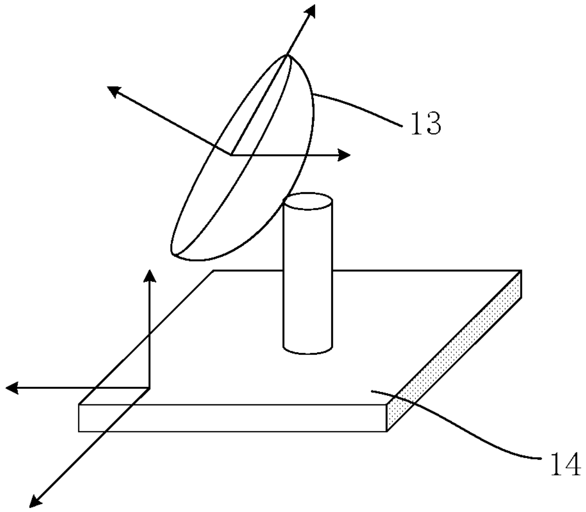
FIG. 2 is a schematic diagram of a reference coordinate system of a conventional mechanically controlled antenna.

With development of low earth orbit satellite Internet technology in recent years, phased array antennas are applied to communications on-the move due to their capabilities such as multi-beam formation, agile beam pointing, non-mechanical beam control and geometric conformal design, which solves limitations of antennas in conventional communications on-the-move. The phased array antenna adjusts a pointing direction by using electronic scanning. Because of eliminating need for mechanical rotation and overcoming structural inertia, rapid re-pointing is realized within microseconds to milliseconds. Consequently, the phased array antennas exhibit superior communications on-the-move tracking capabilities. However, an absence of a mechanical adjustment turntable results in a reference coordinate system of a phased array antenna 11 being the same as a reference coordinate system of a platform 12 (as shown in FIG. 1), unlike a decoupling relationship between a reference coordinate system of the conventional communications on-the-move antenna 13 and a reference coordinate system of the platform 14 (as shown in FIG. 2). Furthermore, a beam pointing of the phased array antenna is unmeasurable, unlike a mechanically controlled antenna, which can be directly measured and corrected by using an attitude sensor. In this way, other closed-loop detection methods are required to correct an error of an open-loop tracking, thereby ensuring tracking accuracy.

Furthermore, a liquid-crystal phased array antenna utilizes a structure with separate transmitting and receiving antennas. A plurality of panel modules are assembled to form a complete receiving or transmitting antenna panel. Each two or more panel modules constitutes a sub-array module, corresponding to an independent beam control board. During processes of tracking and controlling of communications on-the-move, synchronization and coordination are required between different sub-array modules and between the receiving and transmitting antenna panels.

There are several distinct differences between the communications on-the-move based on the liquid-crystal phased array antenna and the conventional communications on-the-move antenna:

1. A beam pointing of the phased array antenna cannot be directly corrected using an attitude sensor, and there is no direct feedback for a pointing correction angle, such that it is necessary to calculate and correct an angle deviation using a tracking method.
2. Unlike mechanical beam scanning in conventional communications on-the-move, the liquid-crystal phased array antenna achieves faster scanning speed by using electronic control scanning. Additionally, a beam width of the phased array antenna increases with an off-axis angle during scanning, whereas a beam width of a flat panel antenna or reflector antenna in conventional communications on-the-move is fixed.
3. A beam response time of the liquid-crystal phased array falls between a conventional mechanical beam control mode (on the order of seconds) and an electronically scanning mode (on the order of microseconds) of an active phased array. A typical response time ranges from 10 ms to 50 ms. Additionally, an inertia navigation data has a refresh rate of 200 Hz. Therefore, the tracking method needs to match a beam response period.
4. During a tracking period, in addition to performing closed-loop detection and beam correction, the liquid-crystal phased array needs to achieve synchronization and coordination between different sub-array modules, and even between the receiving and transmitting antenna panels.

In view of the above differences, a practical application of a communications on-the-move device for the liquid-crystal phased array antenna is provided in embodiments of the present disclosure.

Figure 3:
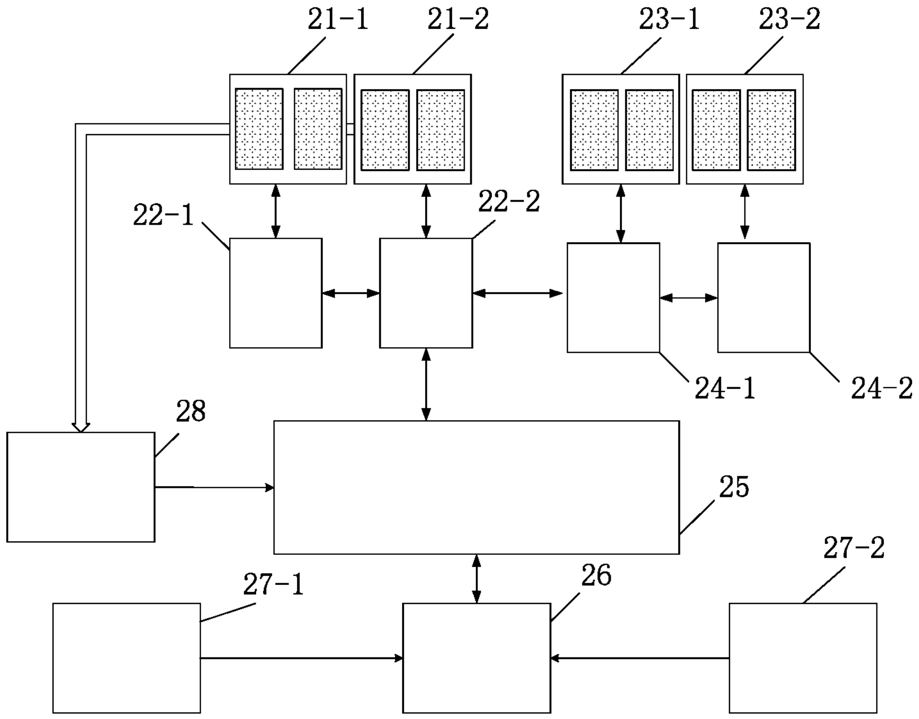
FIG. 3 is a schematic diagram of a system for tracking a satellite according to some embodiments of the present disclosure.

FIG. 3 is a schematic diagram of a system for tracking a satellite according to some embodiments of the present disclosure. As shown in FIG. 3, the system includes a communications on-the-move device and a tracking processing apparatus 25. The communications on-the-move device includes a transmitting phased array antenna, a receiving phased array antenna, a strapdown inertial navigation system and a receiver 28. The transmitting phased array antenna and the receiving phased array antenna are configured to form corresponding antenna beams under control of the tracking processing apparatus. The strapdown inertial navigation system is configured to acquire antenna attitude information and trajectory information, and send the information to the tracking processing apparatus. The receiver is configured to parse a satellite signal received by a receiving phased array antenna, detect a signal strength of the satellite signal, and send detection and parsing results to the tracking processing apparatus. The tracking processing apparatus controls the transmitting phased array antenna and the receiving phased array antenna to form corresponding beams by correcting, based on a received signal, the antenna beam, thereby tracking the satellite.

In some embodiments, the transmitting phased array antenna includes a beam control board of a transmitting phased array antenna and a transmitting phased array antenna sub-array module. The beam control board of the transmitting phased array antenna is configured to control, based on a beamforming instruction received from the tracking processing apparatus, the transmitting phased array antenna to form a corresponding antenna beam. Similarly, the receiving phased array antenna includes a beam control board of a receiving phased array antenna and a receiving phased array antenna sub-array module. It should be noted that in FIG. 3, two receiving phased array antennas and two transmitting phased array antennas are taken as an example. Receiving phased array antenna sub-array modules of the two receiving phased array antennas are labeled as 21-1 and 21-2, and beam control boards of the two receiving phased array antennas are labeled as 22-1 and 22-2; transmitting phased array antenna sub-array modules of the two transmitting phased array antennas are labeled as 23-1 and 23-2, and beam control boards of the two transmitting phased array antennas are labeled as 24-1 and 24-2.

Further, in some embodiments, receiving phased array antenna in the embodiments of the present disclosure is a liquid-crystal phased array receiving phased array antenna, and transmitting phased array antenna is a liquid-crystal phased array transmitting phased array antenna. Either the liquid-crystal phased array receiving phased array antenna or the liquid-crystal phased array transmitting phased array antenna includes a first substrate and a second substrate that are oppositely arranged, and a liquid-crystal layer disposed between the first substrate and the second substrate. The first substrate includes a first dielectric substrate and a first electrode layer arranged on a side of the first dielectric substrate close to the liquid-crystal layer. The second substrate includes a second dielectric substrate and a second electrode layer arranged on a side of the second dielectric substrate close to the liquid-crystal layer. In this case, a dielectric constant of the liquid-crystal layer can be adjusted by modifying the bias voltage applied to both the first electrode layer and second electrode layer. In this way, modulation of the antenna beam is achieved, that is, a change in a pointing angle of the antenna beam is achieved.

In some embodiments, the strapdown inertial navigation system in the embodiments of the present disclosure adopts a structure consisting of an IMU 26 and a GNSS. Both the IMU and the GNSS can detect the pitch angle, the azimuth angle and the roll angle of the communications on-the-move device. The GNSS can also be utilized to correct the azimuth angle output from the strapdown inertial navigation system, thereby improving the tracking accuracy of the system for tracking the satellite in the embodiments of the present disclosure.

Further, in some embodiments of the present disclosure, the GNSS is a differential baseline GNSS formed by GPS 27-1 and 27-2 with different installation baselines.

Specific functions of each component in the system for tracking the satellite in the embodiments of the present disclosure are described below with reference to the method for tracking a satellite hereinafter.

Figure 4:
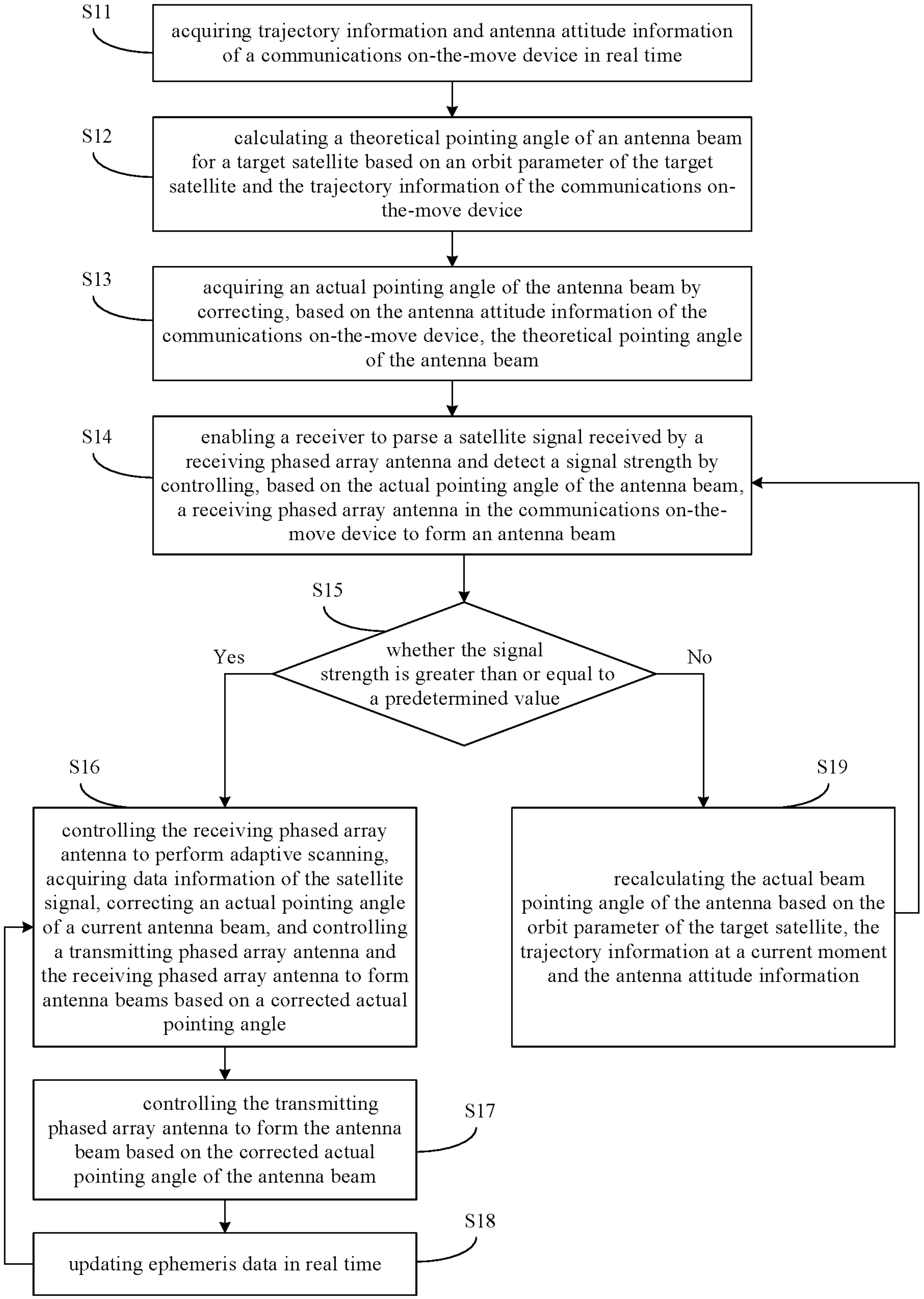
FIG. 4 is a flowchart of a method for tracking a satellite according to some embodiments of the present disclosure.

A method for tracking a satellite is provided in the embodiments of the present disclosure, wherein an execution subject of the method is the tracking processing apparatus in the system for tracking the satellite. FIG. 4 is a flowchart of a method for tracking a satellite according to some embodiments of the present disclosure. As shown in FIG. 4, the method for tracking the satellite includes following processes.

In S11, trajectory information and antenna attitude information of a communications on-the-move device are acquired.

The antenna attitude information includes a pitch angle, an azimuth angle and a roll angle. The pitch angle and the azimuth angle are pointing angles of an antenna. In some embodiments, a strapdown inertial navigation system in the communications on-the-move device acquires the pitch angle, an initial azimuth angle and the roll angle of the antenna (a receiving phased array antenna/a transmitting phased array antenna) in real time and output to the tracking processing apparatus. A GNSS in the strapdown inertial navigation system also acquires the pitch angle, the initial azimuth angle and the roll angle of the antenna. Because a solution method of the strapdown inertial navigation system is different from a solution of the GNSS, acquired results are different. Therefore, in S11, the azimuth angle in the antenna attitude information is acquired by correcting the initial azimuth angle acquired by the strapdown inertial navigation system by using the azimuth angle acquired by the GNSS. While the output results from the strapdown inertial navigation system are directly taken as the pitch angle and the roll angle in the antenna attitude information.

In some embodiments, the trajectory information acquired in S11 is predicted based on a historical trajectory and the pitch angle, the roll angle and the azimuth angle of the antenna that are acquired by the GNSS.

Furthermore, prediction of the trajectory information is performed based on information acquired by the GNSS instead of using the IMU. In this way, computational load on the IMU is reduced, thereby improving a response rate of a measurement and control system while reducing the accuracy requirement of the IMU. The historical trajectory, such as a position vector and a velocity vector $$\begin{bmatrix} \hat{v}_{k-1} \\ \overline{P}_{k-1} \end{bmatrix}$$

of a previous moment, is utilized for prediction $$\begin{bmatrix} \hat{v}_{k} \\ \overline{P}_{k} \end{bmatrix}$$

of the trajectory information, a trajectory prediction information $$\begin{bmatrix} \hat{v}'_{k} \\ \overline{P}'_{k} \end{bmatrix}$$

is updated by using an actual value, and a corresponding prediction parameter is accumulated.

In S12, a theoretical pointing angle of an antenna beam is calculated for a target satellite based on an orbit parameter of the target satellite and the trajectory information of the communications on-the-move device.

Without losing generality, the theoretical pointing angle of the antenna beam is as follows:

$$\text{Azimuth angle: } AZ_0 = \arctan\left[\frac{\tan(\Delta\varphi)}{\sin(\Delta\theta)}\right]$$

$$\text{Pitch angle: } EL_0 = \arctan\left[\frac{\cos(\Delta\varphi)\cos(\Delta\theta) - \frac{R}{R+h}}{\sqrt{1-[\cos(\Delta\varphi)\cos(\Delta\theta)]^2}}\right]$$

Δφ is a difference between an orbital longitude of the target satellite and a location longitude of the communications on-the-move device, Δθ is a difference between an orbital latitude of the satellite and a location latitude of the communications on-the-move device, R is a radius of the earth, and h is an orbital height of the satellite. The azimuth angle is measured from true south, with positive values indicating a deviation towards the west. The pitch angle is an angle between the antenna pointing direction and a horizontal plane, with 0° defined as parallel to the horizontal plane. It should be noted that the longitude and latitude of the communications on-the-move device can be acquired from the trajectory information.

In some embodiments, for a satellite in geostationary orbit (GEO), commonly known as a GEO target satellite, the orbit parameter in S12 is an orbit position information of the target satellite. In this case, in S12, the theoretical pointing angle of the antenna beam is calculated for the target satellite based on the orbit position information of the target satellite and the trajectory information of the communications on-the-move device. A specific calculation method is the above method.

In some embodiments, for non-geostationary orbit (NGSO) satellites, especially those in medium to low earth orbits, ephemeris data predicted by two-line elements (TLE) or instantaneous orbit is commonly utilized. The ephemeris data is either pre-stored in the tracking processing apparatus or updated in real time through the satellite communication network upon establishing a communication connection with the satellite. In some embodiments, the satellite ephemeris data that is updated in real time has a higher reference priority. The orbit parameter in S12 is the ephemeris data. In this case, in S12, the theoretical pointing angle of the antenna beam is calculated for the target satellite based on the ephemeris data of the target satellite and the trajectory information of the communications on-the-move device. A specific calculation method is the above method.

In S13, an actual pointing angle of the antenna beam is acquired by correcting, based on the antenna attitude information of the communications on-the-move device, the theoretical pointing angle of the antenna beam.

It is understood that the antenna attitude information acquired in S11 includes the pitch angle, the roll angle and the azimuth angle, such that an actual pointing angle of the antenna beam can be acquired by correcting the theoretical pointing angle of the antenna beam calculated in S12.

In S14, a receiver is enabled to parse a satellite signal received by the receiving phased array antenna and detect a signal strength of the satellite signal by controlling, based on the actual pointing angle of the antenna beam, a receiving phased array antenna in the communications on-the-move device to form an antenna beam.

In some embodiments, S14 includes following processes: the tracking processing apparatus sends an antenna beam-forming instruction to the transmitting phased array antenna, to control beam control boards 22-2 and 22-1 of the receiving phased array antenna and beam control boards 24-1 and 24-2 of the transmitting phased array antenna to perform time synchronization and frequency synchronization, and control the beam control boards 22-1, 22-2, 24-1 and 24-2 solve a code table to drive corresponding receiving phased array antenna sub-array modules and corresponding transmitting phased array antenna sub-array modules to form beams with a required pointing angle.

It should be noted that the receiver in the embodiments of the present disclosure supports at least DVB-S2 carrier demodulation, and specifically supports DVB-S2/S2X carrier demodulation and beacon detection. Due to a constraint of an instantaneous bandwidth of the liquid-crystal phased array antenna, the beams of the receiving phased array antenna and the transmitting phased array antenna need to be formed based on a code table corresponding to an actual operating frequency band. Therefore, in some embodiments, the receiver is utilized to parse a carrier signal and detect a signal strength based on an actual operating carrier.

In S15, whether the signal strength of the satellite signal is greater than or equal to a predetermined value is determined. In a case that the signal strength is greater than or equal to the predetermined value, the following process S16 is performed; and in a case that the signal strength is less than the predetermined value, the following process S19 is performed.

In S16, in response to the signal strength of the satellite signal being greater than or equal to the predetermined value, a current antenna beam of the receiving phased array antenna is changed, and data information of the satellite signal is acquired, the actual pointing angle of the current antenna beam is corrected, and the satellite signal at a current moment is optimized and the target satellite is locked on by controlling the transmitting phased array antenna and the receiving phased array antenna to form antenna beams based on a corrected actual pointing angle.

Figure 5:
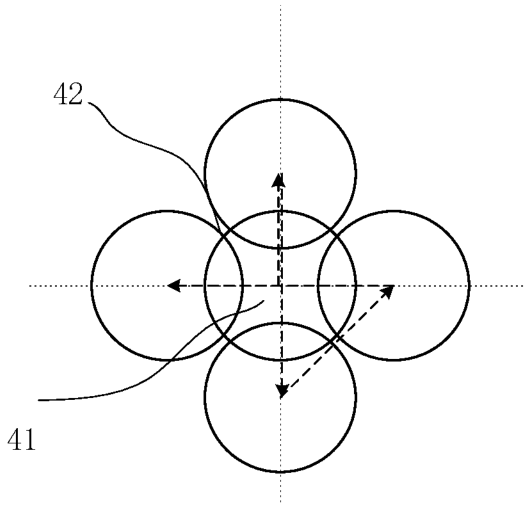
FIG. 5 is a schematic diagram of a trajectory of an antenna beam of a receiving phased array antenna performing scanning within a deviation angle range of a beam pointing angle according to some embodiments of the present disclosure.
Figure 6:
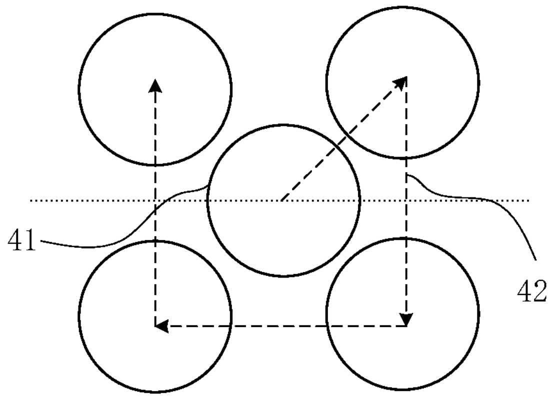
FIG. 6 is another schematic diagram of a trajectory of an antenna beam of a receiving phased array antenna performing scanning within a deviation angle range of a beam pointing angle according to some embodiments of the present disclosure.

In some embodiments, as shown in FIG. 5 and FIG. 6, S16 includes: in response to the satellite signal strength detected by the receiver being greater than or equal to the predetermined value, controlling a current antenna beam 41 of the receiving phased array antenna to perform adaptive scanning within an angle range, performing amplitude comparison detection on strengths of signals received by the receiving phased array antenna beam 41 at different beam position trajectories 42 during at least one scanning cycle, performing angle measurement of the target satellite, correcting an actual pointing angle of the current antenna beam based on results of the amplitude comparison detection and the angle measurement, and controlling the transmitting phased array antenna and the receiving phased array antenna to form antenna beams based on a corrected actual pointing angle, such that a received satellite signal at the current moment is optimized and the target satellite is locked on.

In S16, as shown in FIG. 5 and FIG. 6, the antenna beam of the receiving phased array antenna performs scanning based on the beam position trajectory 42 within a deviation angle range of the pointing angle 41 only after the receiver detects an appropriate signal strength, and the satellite signal is received by the receiver. Because the beams of the receiving phased array antenna and the transmitting phased array antenna operate in frequency division duplexing mode, only the antenna beam of the receiving phased array antenna performs scanning based on the trajectory 42.

Figure 7:
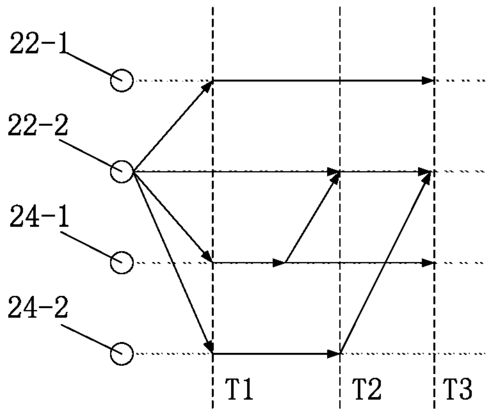
FIG. 7 is a signal flow diagram of time synchronization and frequency synchronization performed by each beam control board according to some embodiments of the present disclosure.

Based on the amplitude comparison detection on the received signal, the tracking processing apparatus continuously corrects the beamforming instruction and sends it to the beam control board 22-2 of the receiving phased array antenna. Simultaneously, the beam control boards 22-2 and 22-1 of the receiving phased array antenna and the beam control boards 24-1 and 24-2 of the transmitting phased array antenna perform time synchronization and frequency synchronization (a signal flowchart of time synchronization and frequency synchronization is shown in FIG. 7). At a moment T1, the beam control board 22-2 sends a broadcast signal to other beam control boards. The beam control board 22-1 does not need to provide feedback, while the beam control boards 24-1 and 24-2 provide feedback signals at moments T2 and T3 respectively. This indicates that time synchronization and frequency synchronization are completed at the moment T3. Subsequently, only the beam control boards 22-1 and 22-2 solve the code table and drive the corresponding receiving phased array antenna sub-array modules to form the antenna beams with the required pointing angle.

In some embodiments, the adaptive scanning deviation angle range of the receiving phased array antenna is adaptively adjusted based on the pitch angle of the antenna beam. For example, in a case that the pitch angle is 90° to 60°, the scanning deviation angle range is 0.5° to 1°. In a case that the pitch angle is 60° to 45°, the scanning deviation angle range is 1° to 1.5°. In a case that the pitch angle is less than 45°, the scanning deviation angle range is 1.5° to 2°. A scanning cycle of the trajectory 42 is typically 60 ms to 100 ms. Further, in some embodiments, the adaptive adjustment of the deviation angle range is based on an estimation value of $$\theta_B \approx \frac{1.772}{N\cos\theta_0}.$$

N is a scale number of the receiving phased array antennas and Go is the pitch angle of the antenna beam.

The scanning beam position trajectory 42 at least includes two distinct angles in a vertical direction and two distinct angles in a horizontal direction. Alternatively, the scanning beam position trajectory 42 at least includes four distinct angles in four coordinate quadrants.

In S17, the transmitting phased array antenna is controlled to form the antenna beam based on the corrected actual pointing angle of the antenna beam.

In some embodiments, S17 includes: controlling, based on the corrected actual pointing angle of the antenna beam, the beam control boards 22-2 and 22-1 of the receiving phased array antennas and the beam control boards 24-1 and 24-2 of the transmitting phased array antennas to perform time synchronization and frequency synchronization, and solving, by the beam control boards 24-1 and 24-2, a code table to drive, by the beam control boards 24-1 and 24-2, corresponding transmitting phased array antenna sub-array modules to form transmitting beams with the required pointing angle. In addition, the tracking processing apparatus realizes power transmission of signals by enabling power amplifying modules (or BUCs) of the transmitting phased array antenna and the receiving phased array antenna.

In S18, a communication link is established, the ephemeris data of the target satellite is updated in real time and stored in the tracking processing apparatus. The process then returns to process S16 for loop execution to maintain continuous communication.

In some embodiments, the method for tracking the satellite in the embodiments of the present disclosure further includes S19: in response to the signal strength of the satellite signal being less than the predetermined value, the actual beam pointing angle of the antenna is recalculated based on the orbit parameter of the target satellite, the trajectory information at the current moment and the antenna attitude information at the current moment. The process then returns to process S14.

That is, in a case that the target satellite signal is weak, the actual beam pointing angle of the antenna is re-calculated based on an updated ephemeris or the orbit position information of the target satellite, the current trajectory information of the communications on-the-move device and the antenna attitude information of the platform that is corrected in real time. That is, the calculation restarts from process S14.

It should be noted that in a case that the receiver is unable to detect the signal strength, that is, in a case that the target satellite cannot be locked on, the power amplifier module (or BUC) remains in a non-enabled state.

In some embodiments, the method for tracking the satellite in the embodiments of the present disclosure includes the aforementioned processes as well as initialization and calibration of the antenna attitude information and the trajectory information of the communications on-the-move device. The process includes: acquiring an antenna attitude information acquired by the strapdown inertial navigation system of the communications on-the-move device at a power-on moment, wherein the antenna attitude information includes the pitch angle, the roll angle and the azimuth angle; predicting initial trajectory information based on the azimuth angle and a historical trajectory information.

Figure 8:
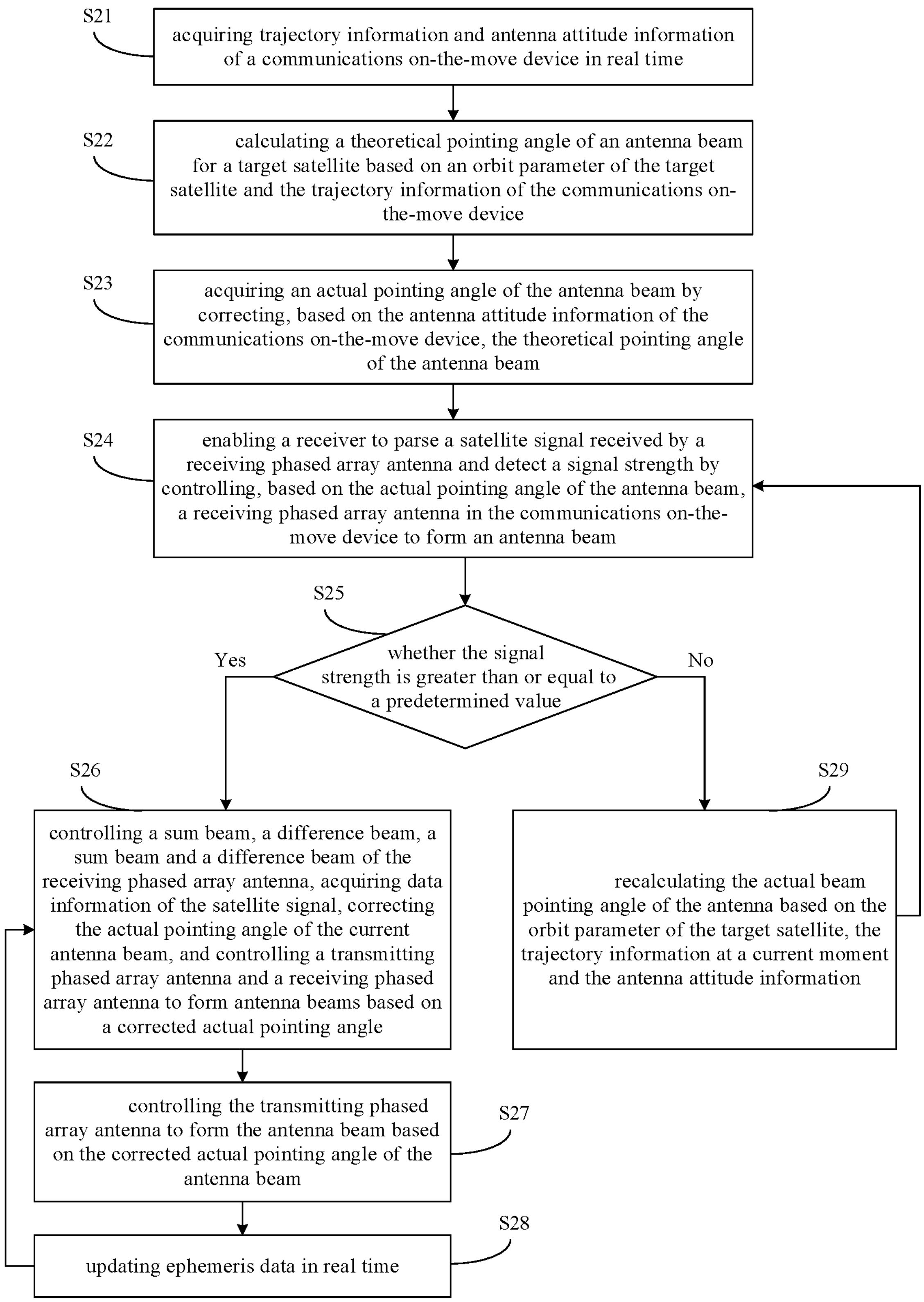
FIG. 8 is a flowchart of another method for tracking a satellite according to some embodiments of the present disclosure.

FIG. 8 is a flowchart of another method for tracking a satellite according to some embodiments of the present disclosure. As shown in FIG. 8, a method for tracking a satellite is further provided in some embodiments of the present disclosure. The method includes processes S21 to S28, in which only process S26 is different from the above-mentioned process S16, and other processes are the same as the above-mentioned processes. The following description focuses on process S26.

Figure 9:
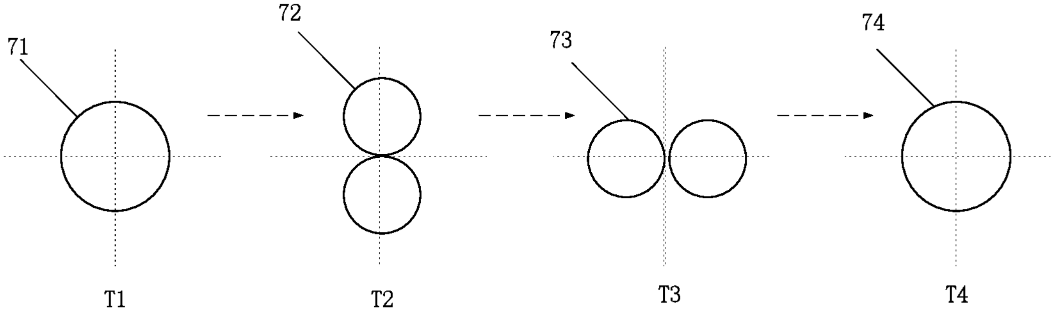
FIG. 9 is a schematic diagram of periodic sum and difference beams according to some embodiments of the present disclosure.

In the embodiments, process S26 includes: in response to the satellite signal strength being greater than or equal to the predetermined value, controlling a current antenna beam of the receiving phased array antenna to periodically form different beams based on a sum beam 71 (T1), a difference beam 72 (T2), a difference beam 73 (T3) and a sum beam 74 (T4) within a periodic cycle (T1-T4). As shown in FIG. 9, amplitude comparison detection is performed on strengths of signals of the target satellite received within at least one cycle, angle measurement is performed on the target satellite, the actual pointing angle of the current antenna beam is corrected based on results of the amplitude comparison detection and the angle measurement, and the transmitting phased array antenna and the receiving phased array antenna are controlled to form antenna beams based on the corrected actual pointing angle, such that the received satellite signal at the current moment is optimized and the target satellite is locked on.

In this process, based on the amplitude comparison detection on the received signal, the tracking processing apparatus continuously corrects the beamforming instruction and sends it to the beam control board 22-2 of the receiving phased array antenna. Simultaneously, the beam control boards 22-2 and 22-1 of the receiving phased array antenna and the beam control boards 24-1 and 24-2 of the transmitting phased array antenna perform time synchronization and frequency synchronization. However, only the beam control boards 22-1 and 22-2 solve the code table and drive the corresponding receiving phased array antenna sub-array modules to generate sum/difference beams periodically. The beam control boards 24-1 and 24-2 of the transmitting phased array antennas solve the code table and drive the corresponding transmitting phased array antenna sub-array modules to keep generating sum beams.

In this embodiment, other processes are the same as the above embodiments, and therefore, details are not repeated herein.

A tracking processing apparatus is provided in the embodiments of the present disclosure. The tracking processing apparatus is utilized to perform the method for tracking the satellite. Specifically, the tracking processing apparatus includes an acquiring module, a calculating module, a first correcting module, a second correcting module, a tracking processing module and an updating module.

The acquiring module is configured to acquire trajectory information and antenna attitude information of a communications on-the-move device. The calculating module is configured to calculate a theoretical pointing angle of an antenna beam for a target satellite based on an orbit parameter of the target satellite and the trajectory information of the communications on-the-move device. The first correcting module is configured to acquire an actual pointing angle of the antenna beam by correcting, based on the antenna attitude information of the communications on-the-move device, the theoretical pointing angle of the antenna beam. The tracking processing module is configured to enable a receiver to parse a satellite signal received by a receiving phased array antenna and detect a signal strength by controlling, based on the actual pointing angle of the antenna beam, a receiving phased array antenna in the communications on-the-move device to form an antenna beam; and control, based on the corrected actual pointing angle of the antenna beam, the transmitting phased array antenna to form an antenna beam. The second correcting module is configured to enable a receiver to parse a satellite signal received by a receiving phased array antenna and detect a signal strength by controlling, based on the actual pointing angle of the antenna beam, the receiving phased array antenna in the communications on-the-move device to form the antenna beam. The updating module is configured to update ephemeris data of the target satellite upon establishing a communication link.

Figure 10:
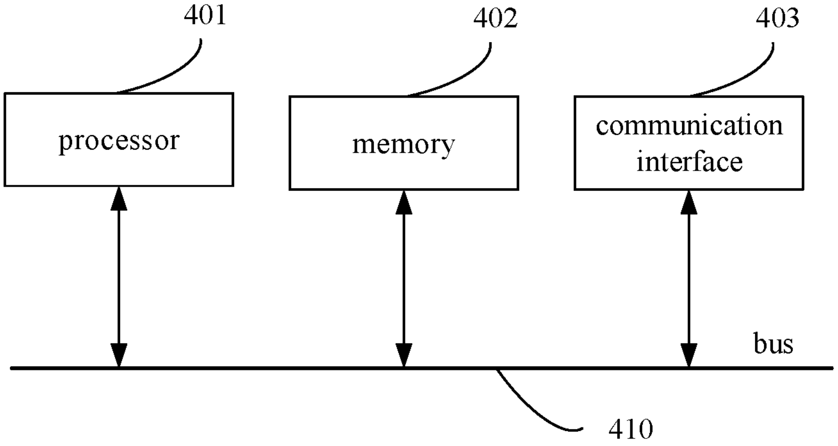
FIG. 10 is a schematic diagram of an electronic device according to some embodiments of the present disclosure.

An electronic device is provided in the embodiments of the present disclosure. As shown in FIG. 10, the electronic device includes a memory 402, a processor 401 and a computer program stored in the memory 402 and able to be run by the processor 401. When the computer program is loaded and run by the processor, causes the processor to perform the method for tracking the satellite described above.

In some embodiments, the processor 401 includes a central processing unit (CPU) or an application specific integrated circuit (ASIC), or the processor 401 is configured as one or more integrated circuits for performing the embodiments of the present disclosure.

In some embodiments, the memory 402 includes a mass memory for data or instructions. By way of example but not limitation, the memory 402 includes a hard disk drive (HDD), a floppy disk drive, a flash memory, an optical disk, a magnetic disk, a magnetic tape, or a universal serial bus (USB) drive, or a combination of two or more of these. If appropriate, the memory 402 includes a removable or non-removable (or fixed) medium. If appropriate, the memory 402 is internal or external to a data processing apparatus. In a specific embodiment, the memory 402 is a non-transitory solid-state memory. In a specific embodiment, the memory 402 includes a read-only memory (ROM). If appropriate, the ROM is a mask programmed ROM, a programmable ROM (PROM), an erasable PROM (EPROM), an electrically erasable PROM (EEPROM), an electrically rewritable ROM (EAROM), a flash memory, or a combination of two or more of these.

When the processor 401 loading and running a computer program instruction in the memory 402, is caused to performed the method for tracking the satellite as described above.

In an embodiment, the electronic device further includes a communication interface 403 and a bus 410. As shown in FIG. 10, the processor 401, the memory 402 and the communication interface 403 are connected through the bus 410 to complete mutual communication.

The communication interface 403 is mainly configured to implement the communication between the modules, apparatus, units, and/or devices in the embodiments of the present disclosure.

The bus 410 includes hardware, software or both, to couple the components of the tracking processing apparatus to each other. By way of example but not limitation, the bus includes an accelerated graphics port (AGP) or another graphics bus, an extended industry standard architecture (EISA) bus, a front-side bus (FSB), a hypertransport (HT) interconnect, an industry standard architecture (ISA) bus, an InfiniBand interconnect, a low pin count (LPC) bus, a memory bus, a microchannel architecture (MCA) bus, a peripheral component interconnect (PCI) bus, a PCI-express (PCI-X) bus, a serial advanced technology attachment (SATA) bus, a video electronics standards association local bus (VLB), or another suitable bus, or a combination of two or more of these. If appropriate, the bus 410 includes one or more buses. Although specific buses are described and illustrated in the embodiments of the present disclosure, any suitable bus or interconnect can be utilized in the present disclosure.

It should be noted herein that the processor in the embodiments of the present disclosure can be utilized to execute the above processes S11 to S19 and S21 to S29.

A non-transitory computer readable storage medium is provided in the embodiments of the present disclosure. The non-transitory computer readable storage medium stores a computer program. The computer program, when loaded and run by a processor, causes the processor to perform the method for tracking the satellite described above.

The foregoing descriptions are merely exemplary embodiments of the present disclosure, and are not intended to limit a protection scope of the present disclosure.

It should be understood by those skilled in the art that the term user terminal covers any suitable type of wireless user devices, such as a mobile phone, a portable data processing device, a portable web browser or a vehicle-mounted mobile station.

In general, the embodiments of the present disclosure are implemented in hardware or dedicated circuits, software, logic, or any combination thereof. For example, some aspects are performed by hardware, while other aspects are performed by firmware or software that can be run by a controller, a microprocessor or other computing devices, but the present disclosure is not limited hereto.

The embodiments of the present disclosure can be realized by a data processor of a mobile apparatus running a computer program instruction, for example, in a processor entity, or by hardware, or by a combination of software and hardware. The computer program instruction is an assembly instruction, an instruction set architecture (ISA) instruction, a machine instruction, a machine-related instruction, micro-code, a firmware instruction, state setting data, or source code or target code written in any combination of one or more programming languages.

The block diagram of any logic flow in the accompanying drawings of the present disclosure represents program processes, or represents interconnected logic circuits, modules and functions, or represents a combination of program processes and logic circuits, modules and functions. The computer program can be stored in the memory. The computer-readable medium includes a non-transitory storage medium. The data processor is of any type of processor suitable for the local technical environment, such as but not limited to a general-purpose computer, a special-purpose computer, a microprocessor, a digital signal processor (DSP), an ASIC, a programmable logic device (FGPA), and a processor based on a multi-core processor architecture.

It is understood that the above embodiments are merely exemplary implementations taken to illustrate the principle of the present disclosure, and the present disclosure is not limited thereto. Various modifications and improvements can be made by those of ordinary skill in the art without departing from the spirit and essence of the present disclosure, and these modifications and improvements are also considered as falling within the protection scope of the present disclosure.

The invention claimed is:

1. A method for tracking a satellite, comprising:

acquiring trajectory information and antenna attitude information of a communications on-the-move device in real time;

calculating a theoretical pointing angle of an antenna beam for a target satellite based on an orbit parameter of the target satellite and the trajectory information of the communications on-the-move device;

acquiring an actual pointing angle of the antenna beam by correcting, based on the antenna attitude information of the communications on-the-move device, the theoretical pointing angle of the antenna beam;

enabling a receiver to parse a satellite signal received by a receiving phased array antenna and detect a signal strength of the satellite signal by controlling, based on the actual pointing angle of the antenna beam, a receiving phased array antenna in the communications on-the-move device to form an antenna beam;

in response to the signal strength of the satellite signal being greater than or equal to a predetermined value, changing a current antenna beam of the receiving phased array antenna, acquiring data information of the satellite signal, correcting an actual pointing angle of the current antenna beam, and controlling a transmitting phased array antenna and the receiving phased array antenna to form antenna beams based on a corrected actual pointing angle; and establishing a communication link and updating ephemeris data of the target satellite;

wherein the enabling the receiver to parse the satellite signal received by the receiving phased array antenna and detect the signal strength of the satellite signal by controlling, based on the actual pointing angle of the antenna beam, the receiving phased array antenna in the communications on-the-move device to form the antenna beam comprises:

by sending, based on the actual pointing angle of the antenna beam, a beamforming instruction to a beam control board of a sub-array module of one receiving phased array antenna in the communications on-the-move device, enabling a beam control board of a sub-array module of another remaining receiving phased array antenna and a beam control board of each transmitting phased array antenna to perform time synchronization and frequency synchronization, and enable, by solving a code table to drive a receiving sub-array module of a corresponding receiving phased array antenna and a transmitting sub-array module of the transmitting phased array antenna to form antenna beams based on the actual pointing angle, the receiver to parse the satellite signal received by the receiving phased array antenna and detect the signal strength.

2. The method according to claim 1, further comprising:

in response to the signal strength of the satellite signal being less than the predetermined value, calculating the actual pointing angle of the antenna beam at a current moment based on the orbit parameter of the target satellite, and the trajectory information and the antenna attitude information of the communications on-the-move device at the current moment, and performing the process of enabling the receiver to parse the satellite signal received by the receiving phased array antenna and detect the signal strength by controlling, based on the actual pointing angle of the antenna beam, the receiving phased array antenna in the communications on-the-move device to form the antenna beam.

3. The method according to claim 1, wherein the antenna attitude information comprises a pitch angle, a roll angle and an azimuth angle of the antenna beam; and the acquiring the trajectory information and the antenna attitude information of the communications on-the-move device in real time comprises:

acquiring the pitch angle, the roll angle and an initial azimuth angle determined by a strapdown inertial navigation system in the communications on-the-move device, and acquiring a reference azimuth angle determined by a global navigation satellite system (GNSS) in the strapdown inertial navigation system; and acquiring the azimuth angle by correcting the initial azimuth angle using the reference azimuth angle.

4. The method according to claim 1, wherein in a case that the target satellite is a geostationary satellite, the orbit parameter comprises orbit position information; and the calculating the theoretical pointing angle of the antenna beam for the target satellite based on the orbit parameter of the target satellite and the trajectory information of the communications on-the-move device comprises:

for the target satellite, calculating the theoretical pointing angle of the antenna beam based on the orbit position information of the target satellite and the trajectory information of the communications on-the-move device.

5. The method according to claim 1, wherein in a case that the target satellite is a geostationary satellite, the orbit parameter comprises ephemeris data; and the calculating the theoretical pointing angle of the antenna beam for the target satellite based on the orbit parameter of the target satellite and the trajectory information of the communications on-the-move device comprises:

for the target satellite, establishing time synchronization with the ephemeris data of the target satellite by using time information output by a GNSS of a strapdown inertial navigation system in the communications on-the-move device, and calculating the theoretical pointing angle of the antenna beam based on the ephemeris data and the trajectory information of the communications on-the-move device.

6. The method according to claim 1, wherein the in response to the signal strength of the satellite signal being greater than or equal to the predetermined value, changing the current antenna beam of the receiving phased array antenna, acquiring the data information of the satellite signal, correcting the actual pointing angle of the current antenna beam, and controlling the transmitting phased array antenna and the receiving phased array antenna to form the antenna beams based on the corrected actual pointing angle comprises:

in response to the signal strength of the satellite signal being greater than or equal to the predetermined value, controlling the current antenna beam of the receiving phased array antenna to perform adaptive scanning within an angle range, performing amplitude comparison detection on strengths of signals of the target satellite received at different beam positions along a beam trajectory of the receiving phased array antenna within at least one scanning cycle, performing angle measurement of the target satellite, correcting the actual pointing angle of the current antenna beam based on results of the amplitude comparison detection and the angle measurement, and controlling the transmitting phased array antenna and the receiving phased array antenna to form the antenna beams based on the corrected actual pointing angle.

7. The method according to claim 1, wherein the in response to the signal strength of the satellite signal being greater than or equal to the predetermined value, changing the current antenna beam of the receiving phased array antenna, acquiring the data information of the satellite signal, correcting the actual pointing angle of the current antenna beam, and controlling the transmitting phased array antenna and the receiving phased array antenna to form the antenna beams based on the corrected actual pointing angle comprises:

in response to the satellite signal strength being greater than or equal to the predetermined value, controlling the current antenna beam of the receiving phased array antenna to periodically form beams in a pattern of "sum beam—difference beam—difference beam—sum beam", performing amplitude comparison detection on strengths of signals of the target satellite received within at least one cycle, performing angle measurement of the target satellite, correcting the actual pointing angle of the current antenna beam based on results of the amplitude comparison detection and the angle measurement, and controlling the transmitting phased array antenna and the receiving phased array antenna to form the antenna beams based on the corrected actual pointing angle.

8. The method according to claim 1, further comprising:

acquiring the antenna attitude information acquired by a strapdown inertial navigation system of the communications on-the-move device at a power-on moment, wherein the antenna attitude information comprises a pitch angle, a roll angle and an azimuth angle; and predicting initial trajectory information based on the azimuth angle and a historical trajectory.

9. An electronic device for tracking a satellite, comprising:

a memory, a processor and a computer program stored in the memory and able to run by the processor, wherein when the computer program is loaded and run by the processor, causes the processor to perform:

acquiring trajectory information and antenna attitude information of a communications on-the-move device in real time;

calculating a theoretical pointing angle of an antenna beam for a target satellite based on an orbit parameter of the target satellite and the trajectory information of the communications on-the-move device;

acquiring an actual pointing angle of the antenna beam by correcting, based on the antenna attitude information of the communications on-the-move device, the theoretical pointing angle of the antenna beam;

enabling a receiver to parse a satellite signal received by a receiving phased array antenna and detect a signal strength of the satellite signal by controlling, based on the actual pointing angle of the antenna beam, a receiving phased array antenna in the communications on-the-move device to form an antenna beam;

in response to the signal strength of the satellite signal being greater than or equal to a predetermined value, changing a current antenna beam of the receiving phased array antenna, acquiring data information of the satellite signal, correcting an actual pointing angle of the current antenna beam, and controlling a transmitting phased array antenna and the receiving phased array antenna to form antenna beams based on a corrected actual pointing angle; and establishing a communication link and updating ephemeris data of the target satellite;

wherein when the computer program is loaded and run by the processor, causes the processor to perform:

by sending, based on the actual pointing angle of the antenna beam, a beamforming instruction to a beam control board of a sub-array module of one receiving phased array antenna in the communications on-the-move device, enabling a beam control board of a sub-array module of another remaining receiving phased array antenna and a beam control board of each transmitting phased array antenna to perform time synchronization and frequency synchronization, and enable, by solving a code table to drive a receiving sub-array module of a corresponding receiving phased array antenna and a transmitting sub-array module of the transmitting phased array antenna to form antenna beams based on the actual pointing angle, the receiver to parse the satellite signal received by the receiving phased array antenna and detect the signal strength.

10. The electronic device according to claim 9, wherein when the computer program is loaded and run by the processor, further causes the processor to perform:

in response to the signal strength of the satellite signal being less than the predetermined value, calculating the actual pointing angle of the antenna beam at a current moment based on the orbit parameter of the target satellite, and the trajectory information and the antenna attitude information of the communications on-the-move device at the current moment, and performing the process of enabling the receiver to parse the satellite signal received by the receiving phased array antenna and detect the signal strength by controlling, based on the actual pointing angle of the antenna beam, the receiving phased array antenna in the communications on-the-move device to form the antenna beam.

11. The electronic device according to claim 9, wherein the antenna attitude information comprises a pitch angle, a roll angle and an azimuth angle of the antenna beam; and when the computer program is loaded and run by the processor, causes the processor to perform:

acquiring the pitch angle, the roll angle and an initial azimuth angle determined by a strapdown inertial navigation system in the communications on-the-move device, and acquiring a reference azimuth angle determined by a global navigation satellite system (GNSS) in the strapdown inertial navigation system; and acquiring the azimuth angle by correcting the initial azimuth angle using the reference azimuth angle.

12. The electronic device according to claim 9, wherein in a case that the target satellite is a geostationary satellite, the orbit parameter comprises orbit position information; and when the computer program is loaded and run by the processor, causes the processor to perform:

for the target satellite, calculating the theoretical pointing angle of the antenna beam based on the orbit position information of the target satellite and the trajectory information of the communications on-the-move device.

13. The electronic device according to claim 9, wherein in a case that the target satellite is a geostationary satellite, the orbit parameter comprises ephemeris data; and when the computer program is loaded and run by the processor, causes the processor to perform:

for the target satellite, establishing time synchronization with the ephemeris data of the target satellite by using time information output by a GNSS of a strapdown inertial navigation system in the communications on-the-move device, and calculating the theoretical pointing angle of the antenna beam based on the ephemeris data and the trajectory information of the communications on-the-move device.

14. The electronic device according to claim 9, wherein when the computer program is loaded and run by the processor, causes the processor to perform:

in response to the signal strength of the satellite signal being greater than or equal to the predetermined value, controlling the current antenna beam of the receiving phased array antenna to perform adaptive scanning within an angle range, performing amplitude comparison detection on strengths of signals of the target satellite received at different beam positions along a beam trajectory of the receiving phased array antenna within at least one scanning cycle, performing angle measurement of the target satellite, correcting the actual pointing angle of the current antenna beam based on results of the amplitude comparison detection and the angle measurement, and controlling the transmitting phased array antenna and the receiving phased array antenna to form the antenna beams based on the corrected actual pointing angle.

15. The electronic device according to claim 9, wherein when the computer program is loaded and run by the processor, causes the processor to perform:

in response to the satellite signal strength being greater than or equal to the predetermined value, controlling the current antenna beam of the receiving phased array antenna to periodically form beams in a pattern of "sum beam—difference beam—difference beam—sum beam", performing amplitude comparison detection on strengths of signals of the target satellite received within at least one cycle, performing angle measurement of the target satellite, correcting the actual pointing angle of the current antenna beam based on results of the amplitude comparison detection and the angle measurement, and controlling the transmitting phased array antenna and the receiving phased array antenna to form the antenna beams based on the corrected actual pointing angle.

16. The electronic device according to claim 9, wherein when the computer program is loaded and run by the processor, further causes the processor to perform:

acquiring the antenna attitude information acquired by a strapdown inertial navigation system of the communications on-the-move device at a power-on moment, wherein the antenna attitude information comprises a pitch angle, a roll angle and an azimuth angle; and predicting initial trajectory information based on the azimuth angle and a historical trajectory.

17. A non-transitory computer-readable storage medium, wherein the non-transitory computer-readable storage medium stores a program of a method for tracking a satellite, and when the program is loaded and run by a processor, causes the processor to perform:

acquiring trajectory information and antenna attitude information of a communications on-the-move device in real time;

calculating a theoretical pointing angle of an antenna beam for a target satellite based on an orbit parameter of the target satellite and the trajectory information of the communications on-the-move device;

acquiring an actual pointing angle of the antenna beam by correcting, based on the antenna attitude information of the communications on-the-move device, the theoretical pointing angle of the antenna beam;

enabling a receiver to parse a satellite signal received by a receiving phased array antenna and detect a signal strength of the satellite signal by controlling, based on the actual pointing angle of the antenna beam, a receiving phased array antenna in the communications on-the-move device to form an antenna beam;

in response to the signal strength of the satellite signal being greater than or equal to a predetermined value, changing a current antenna beam of the receiving phased array antenna, acquiring data information of the satellite signal, correcting an actual pointing angle of the current antenna beam, and controlling a transmitting phased array antenna and the receiving phased array antenna to form antenna beams based on a corrected actual pointing angle; and establishing a communication link and updating ephemeris data of the target satellite;

wherein the enabling the receiver to parse the satellite signal received by the receiving phased array antenna and detect the signal strength of the satellite signal by controlling, based on the actual pointing angle of the antenna beam, the receiving phased array antenna in the communications on-the-move device to form the antenna beam comprises:

by sending, based on the actual pointing angle of the antenna beam, a beamforming instruction to a beam control board of a sub-array module of one receiving phased array antenna in the communications on-the-move device, enabling a beam control board of a sub-array module of another remaining receiving phased array antenna and a beam control board of each transmitting phased array antenna to perform time synchronization and frequency synchronization, and enable, by solving a code table to drive a receiving sub-array module of a corresponding receiving phased array antenna and a transmitting sub-array module of the transmitting phased array antenna to form antenna beams based on the actual pointing angle, the receiver to parse the satellite signal received by the receiving phased array antenna and detect the signal strength.

18. The non-transitory computer-readable storage medium according to claim 17, wherein when the program is loaded and run by a processor, further causes the processor to perform:

in response to the signal strength of the satellite signal being less than the predetermined value, calculating the actual pointing angle of the antenna beam at a current moment based on the orbit parameter of the target satellite, and the trajectory information and the antenna attitude information of the communications on-the-move device at the current moment, and performing the process of enabling the receiver to parse the satellite signal received by the receiving phased array antenna and detect the signal strength by controlling, based on the actual pointing angle of the antenna beam, the receiving phased array antenna in the communications on-the-move device to form the antenna beam.

* * * * *